United States Patent
Fukushima et al.

(10) Patent No.: US 6,441,982 B1
(45) Date of Patent: Aug. 27, 2002

(54) DUMMY WRITE METHOD FOR A MAGNETIC HEAD AND DRIVE UNIT FOR CARRYING OUT THE METHOD

(75) Inventors: Yukio Fukushima, Tokyo-to; Tetsuo Ueda, Sagamihara; Hideo Asano, Machida, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/448,234

(22) Filed: Nov. 24, 1999

(30) Foreign Application Priority Data

Nov. 26, 1998 (JP) .......................................... 10-335818

(51) Int. Cl.[7] ................................................. G11B 5/09
(52) U.S. Cl. .......................................... 360/59; 360/31
(58) Field of Search ............................ 360/66, 59, 25, 360/31, 72.01, 69, 75, 60, 53

(56) References Cited

U.S. PATENT DOCUMENTS

| | | | | |
|---|---|---|---|---|
| 5,959,801 A | * | 9/1999 | Gillis et al. | 360/235.3 |
| 5,991,113 A | * | 11/1999 | Meyer et al. | 360/234.7 |
| 6,118,607 A | * | 9/2000 | Jung | 360/53 |
| 6,122,131 A | * | 9/2000 | Jeppson | 360/77.02 |

* cited by examiner

Primary Examiner—David Hudspeth
Assistant Examiner—Varsha A. Kapadia
(74) Attorney, Agent, or Firm—G. Marlin Knight; Ron Feece

(57) ABSTRACT

A drive unit which recovers from write instability by heating the magnetic head prior to performing a dummy write operation is described. In the preferred embodiments, once write instability has been detected the head may be heated by friction with the rotating disk or by an external heater. In the friction method the head is moved to a safe area of the disk such as a textured landing zone while the disk rotation is continued. In drives using unload ramps, a heater is preferably placed at the the ramp so that the head can be heated while parked on the ramp. In each of these embodiments dummy write operations are performed while the head is in a thermally excited state due to the heating. The combination of heating and the dummy write operation aids in restoring write stability.

15 Claims, 4 Drawing Sheets

DUMMY WRITE METHOD FOR A MAGNETIC HEAD AND DRIVE UNIT FOR CARRYING OUT THE METHOD

DETAILED DESCRIPTION OF THE INVENTION

1. Field of the Invention

The present invention relates to a dummy write method for recovering a magnetic head from a write instability state and a drive unit for carrying out the method.

2. Description of Related Art

Metal-in-gap (MIG) heads, thin-film heads, magnetoresistive (MR) heads, giant magnetoresistive (GMR) heads, etc., are known as magnetic heads for hard-disk drive units. In these MIG heads, thin-film heads, MR heads, and GMR heads, particularly in MR and GMR heads, when the head is divided into a head for reading out data and servo information from a magnetic disk, a recording head, and a reproducing head, it is widely known that a write instability phenomenon, in which a read waveform produced by write operation deforms, appears in the reproducing head. Since the state of the magnetic head depends upon the write operation, there are cases where the state becomes better or becomes worse for each write operation.

FIG. 4 shows a characteristic read waveform example of write instability. In the figure, the large amplitude portion in the upper waveform represents a waveform when a servo pattern is read out for obtaining a position error signal (PES) that is used in tracking, and that portion is shown on an enlarged scale on the lower side of FIG. 4. In the example shown in FIG. 4, as evident in the lower waveform, there is shown write instability in which the waveform is offset toward the upper side and is not vertically symmetrical.

There are cases where the magnetic head recovers from this write instability immediately after the occurrence without any write operation, but there are cases where the phenomenon remains. Because of this phenomenon, servo information cannot be read out correctly and a write error will occur. In the worst case, the magnetic head cannot follow a target track and an error will occur in a seek operation. For this reason, a dummy write method has been employed as a method of returning the magnetic head from the write instability state to the normal state.

SUMMARY OF THE INVENTION

The present invention is applied to a dummy write method for recovering a magnetic head from a write instability state. This dummy write is performed by performing write operation with a thermally excited, i.e., heated, magnetic head. With this technique, the magnetic head can be restored to write stability more reliably from write instability, compared with the case where it is recovered by the use of a dummy write alone. The present invention is also applied to a drive unit for carrying out the above-mentioned dummy write method.

In one preferred embodiment of a method according to the invention once the write instability has been detected the magnetic head is heated by friction between the magnetic disk and the magnetic head. In this embodiment the dummy write is performed at a landing zone where the magnetic head is parked during non-operation. In still another preferred embodiment, the magnetic head is thermally excited by applying heat to the magnetic head from the outside. A heater is provided at a ramp of a loading/unloading mechanism for lifting the magnetic head during non-operation or in a lift mechanism. A dummy write is performed while the magnetic head is parked on the ramp or lift mechanism and after being heated. Furthermore, in this embodiment, it is preferable that dummy write be performed using a DC erase signal.

The dummy write method employs the fact that the write instability phenomenon varies its state when write operations are performed. The magnetic head performs write operations a few times, using a safe area on or away from the magnetic disk. When the state of the magnetic head improves, i.e., the write instability is removed, and the head cools, a seek operation is performed to the target track and the original normal write or read operation is continued. The dummy write method is performed either in a track following state or when the magnetic head is removed (unloaded) from the magnetic disk.

DETAILED DESCRIPTION OF THE DRAWINGS

Figure 1:
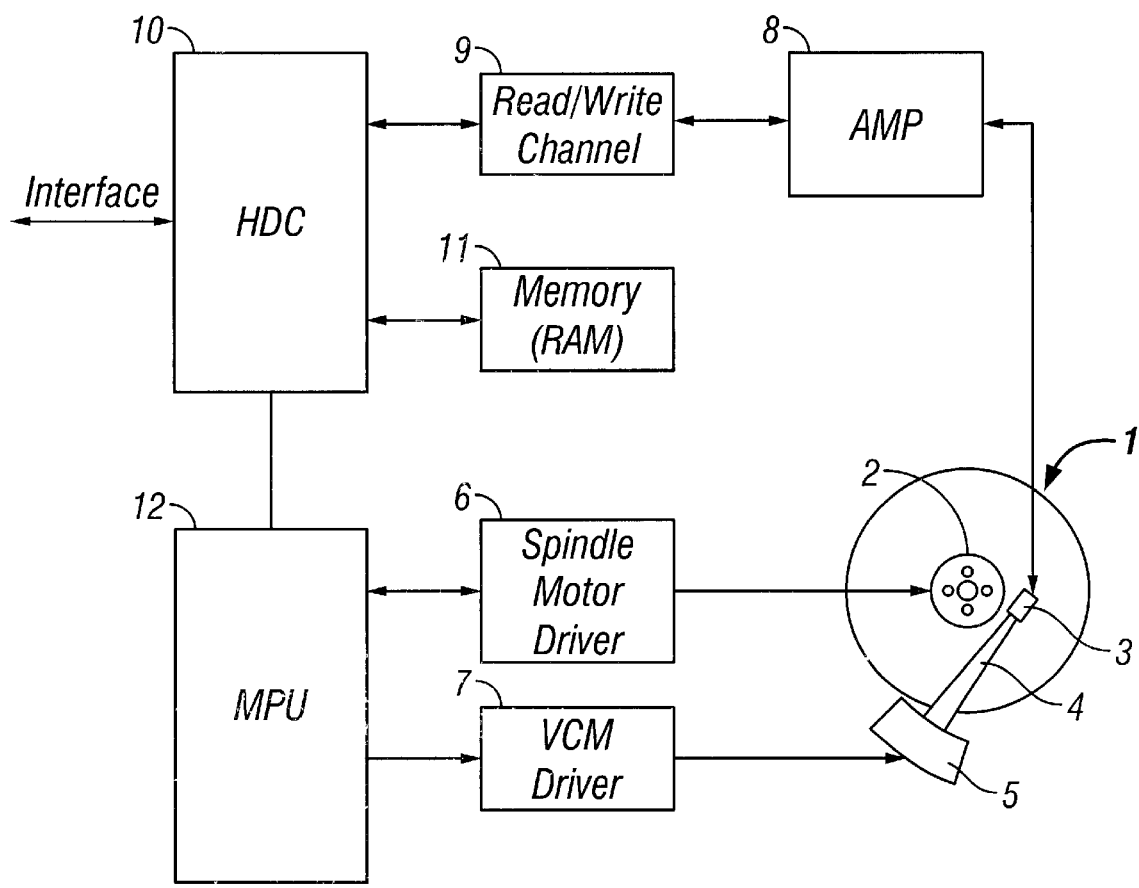
FIG. 1 is a diagram showing a constitution example of a hard-disk drive unit that carries out a dummy write method for a magnetic head of the present invention.

FIG. 1 is a diagram showing a constitution example of a hard-disk drive unit that carries out a dummy write method for a magnetic head of the present invention. In the example shown in FIG. 1, the hard-disk drive unit is constructed of a magnetic disk 1, a spindle motor 2, a magnetic head 3, an actuator 4, and a voice coil motor (VCM) 5. To drive these components, a spindle motor driver 6, a VCM driver 7, an amplifier (AMP) 8, a read/write channel 9, a hard-disk controller (HDC) 10, a random access memory (RAM) 11, and a microprocessor unit (MPU) 12 are interconnected as shown in FIG. 1 and constitute a drive circuit.

In the drive unit shown in FIG. 1, rotation of the disk 1 is controlled by driving the spindle motor 2 by the spindle motor driver 6, based on commands from the HDC 10 and MPU 12. Also, the movement of the magnetic head 3 onto a target track on the disk 1 is controlled by driving the VCM 5 by the VCM driver 7, based on commands from the HDC 10 and MPU 12. Furthermore, the read operation by the magnetic head 3 is performed by supplying a signal read by the magnetic head 3 to the HDC 10 through the AMP 8 and read/write channel 9. On the other hand, the write operation by the magnetic head 3 is perform by supplying information to be written to the magnetic head 3 through the read/write channel 9 and AMP 8, based on information stored in the memory 11 and a command from the HDC 10.

In the hard-disk drive unit shown in FIG. 1, when the write instability of the magnetic head 3 is detected, a dummy write is executed, for example, by performing the write operation a few times over an area on the magnetic disk 1 which is not a data recording track. The present invention is characterized in that the dummy write is performed while the magnetic head is thermally excited or heated. With this method, the magnetic head can be recovered more reliably from write instability, compared with the case where the dummy write alone is used.

Figure 2A:
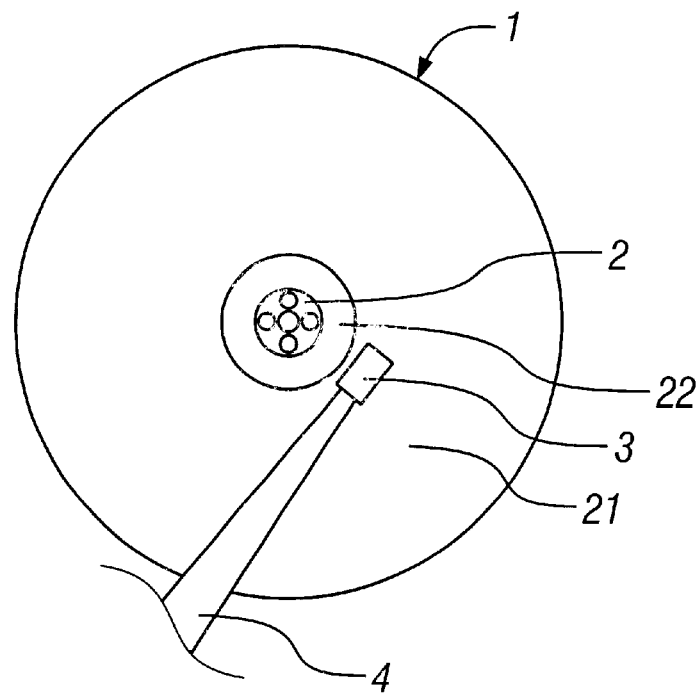
FIG. 2 is a diagram showing a constitution example of a magnetic disk that carries out a preferred embodiment of the dummy write method for a magnetic disk of the present invention.

FIGS. 2(a) and (b) are diagrams showing examples of the magnetic disks 1 to which the present invention is applied. In the example shown in FIG. 2(a), the surface of the magnetic disk 1 is constructed of an outer data zone 21 and an inner landing zone 22. The outer data zone 21 is an area for recording data and has a precision flat surface. The inner landing zone 22 is an area on which the magnetic disk 3 lands during non-operation. This area is provided with uneven textures or bumps to prevent the magnetic head 3 from sticking to the magnetic disk 1. In the example shown in FIG. 2(b), the surface of the magnetic disk 1 is constructed of a flat data zone 21, and the magnetic disk 1 is provided with a ramp or lift mechanism 23 for removing the magnetic head 3 by a so-called loading/unloading mechanism during non-operation.

A practical preferred embodiment of the dummy write method for a magnetic head of the present invention will hereinafter be described with reference to FIGS. 2(a) and (b). First, in the example shown in FIG. 2(a), the landing zone 22 is utilized to thermally excite the magnetic head 3 by the friction between the magnetic head 3 and the magnetic disk 1. In recent years, the flying height of the magnetic disk 3 has steadily been reduced. At the landing zone 22 provided on the innermost circumference of the magnetic disk 1 where the magnetic head 3 performs a contact-start-stop (CSS) operation, the magnetic head 3 often strikes microscopic protrusions, such as the textures or bumps in the landing zone 23. In a preferred embodiment of the present invention, the dummy write is performed with the magnetic head over the landing zone 22 while the magnetic disk 3 is being rotated. By doing this, the magnetic head 3 can be heated to a predetermined temperature and placed in a thermally excited state.

Figure 2B:
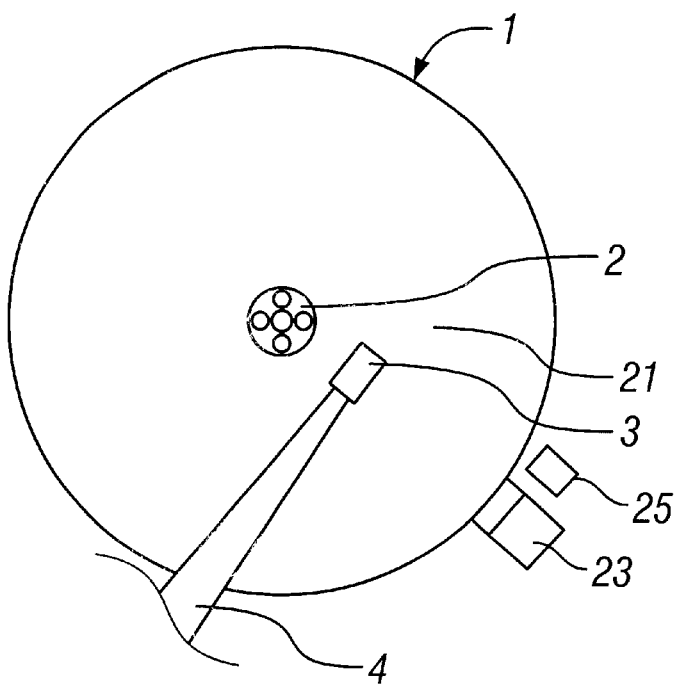

Next, in the example shown in FIG. 2(b), the ramp or lift mechanism 23 is utilized to thermally excite the magnetic head 3 by applying heat from the outside to the magnetic head 3 parked on the ramp or lift mechanism 23. Specifically, the ramp or lift mechanism 23 is provided with a heater 25. The magnetic head 3 is parked on the ramp or lift mechanism 23 and heated, then the dummy write is performed with the head still on the ramp and safely away from the data areas of the disk. As with the above-mentioned example, the magnetic head 3 is thereby placed in a thermally excited state.

Figure 3:
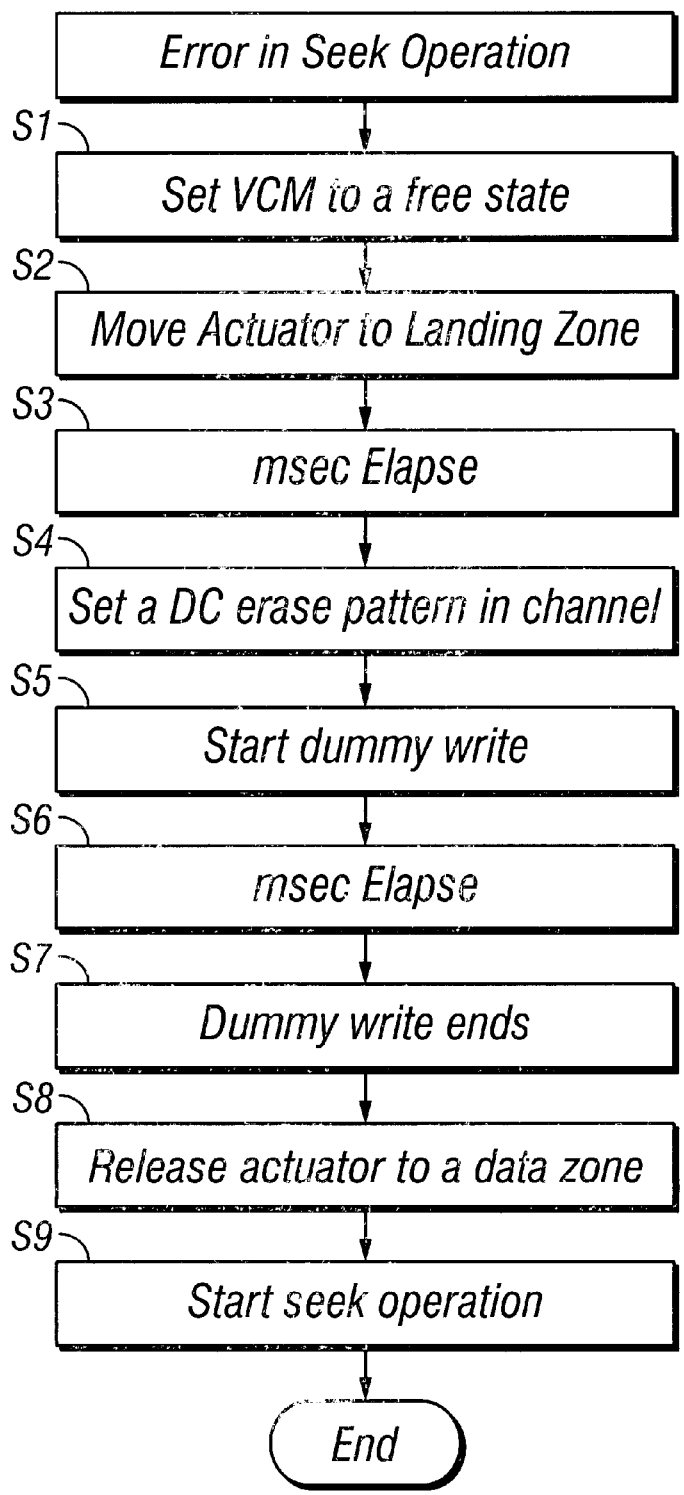
FIG. 3 is a flowchart showing an example of the dummy write method for a magnetic disk of the present invention.
Figure 4:
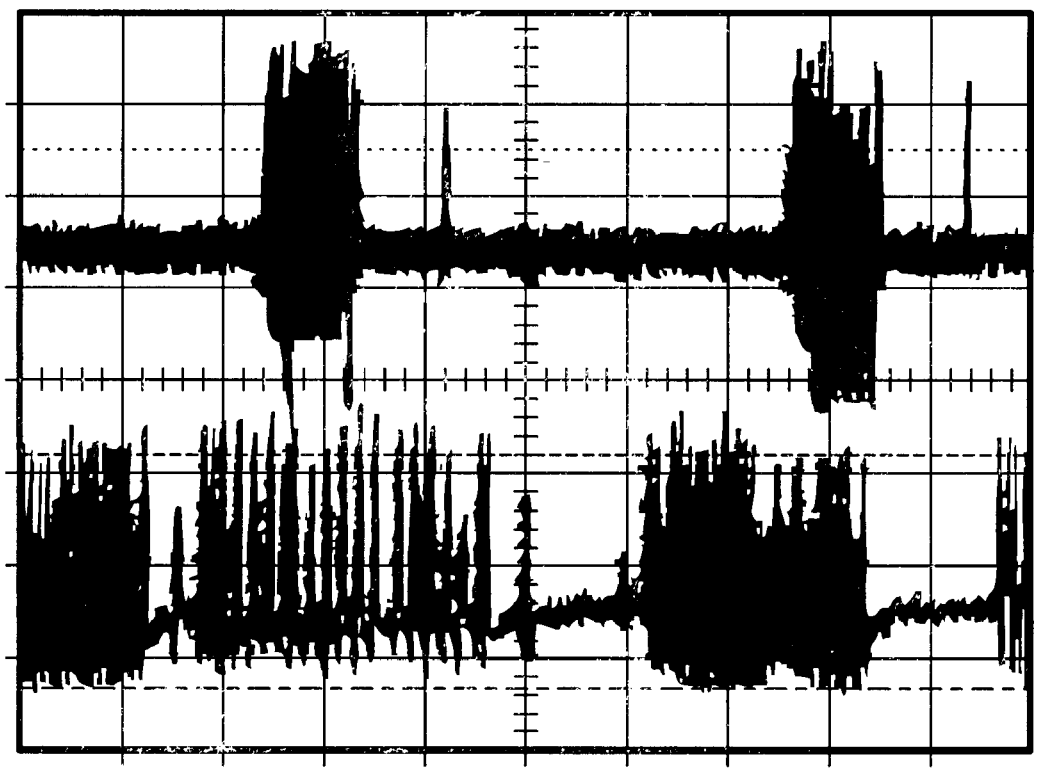
FIG. 4 shows a characteristic read waveform example of the problem of write instability which the invention addresses.

FIG. 3 is a flowchart showing an example of a method of performing dummy write in the case where an error occurs in a seek operation on a disk with a landing zone 22. In the embodiment shown in FIG. 3, if an error occurs in a seek operation, the VCM 5 is first released into a free state (S1). Then, driving current flows in the VCM 5 to move it in the direction of the landing zone 22, and the actuator 4 is moved to the landing zone 22 (S2). Some milliseconds (msec) elapse until the actuator movement is completed (S3). Then, a DC erase pattern, for example, is set in the read/write channel 9 (S4). In this state, a dummy write is started (S5). Then, some milliseconds elapse (S6) and the dummy write is ended (S7). Thereafter, the actuator 4 is released to move the data zone (S8), and the seek operation is started (S9).

FIG. 3 is a flowchart showing an example of a method of performing dummy write in the case where an occurs in a seek operation on a disk with a landing zone 23. In the embodiment shown in FIG. 3, if an error occurs in a seek operation, the VCM 5 is first released into a free state (S1). Then, driving current flows in the VCM 5 to move it in the direction of the landing zone 23, and the actuator 4 is moved to the landing zone 23 (S2). Some milliseconds (msec) elapse until the actuator movement is completed (S3). Then, a DC erase pattern, for example, is set in the read/write channel 9 (S4). In this state, a dummy write is started (S5). Then, some milliseconds elapse (S6) and the dummy write is ended (S7). Thereafter, the actuator 4 is released to the data zone (S8), and the seek operation is started (S9).

Next, a description will be made of a write signal that is used when the dummy write is performed. The write signal that is actually used when the dummy write is performed, it is not particularly limited by the present invention. However, for a DC erase signal and a 9T (⅑ of a basic frequency) signal, dummy write was actually performed with a bi-modal write instability state (test No. 1) and with asymmetry write instability state (test Nos. 2 and 3). The results are listed in Table 1. From Table 1 it follows that for the outputs of the AMP after the dummy write, both the DC erase signal and the 9T signal are sufficiently great in all the modes. Also, similar recovery is obtained, and the case of the DC erase signal is higher in stability than the case of the 9T signal. From this it follows that, in this example, it is preferable that the DC erase signal be used when dummy write is performed.

TABLE 1

| Test No. | Signal type | AMP (mV) | Stability |
| --- | --- | --- | --- |
| 1 | DC erase signal | 269 | Stable |
|   | 9T | 263 | Unstable |
| 2 | DC erase signal | 142–252 | Stable |
|   | 9T | 239 | Unstable |
| 3 | DC erase signal | 216 | Stable |
|   | 9T | 247 | Unstable |

According to the present invention, as evident in the foregoing description, dummy write is performed while the magnetic head is thermally excited. By doing this, the magnetic head can be recovered more reliably from write instability, compared with the case where it is recovered by the dummy write alone.

In one preferred embodiment, the magnetic head is thermally excited by friction between the magnetic head and the magnetic disk and the dummy write is performed while the magnetic disk is rotated with the head on/over the landing zone. In still another preferred embodiment, the magnetic head is thermally excited by applying heat to the magnetic head from the outside. A heater is provided at a ramp of a loading/unloading mechanism. The dummy write is performed while the magnetic head is heated on the ramp or lift mechanism.

What is claimed is:

1. A method for restoring write stability to a magnetic head, comprising the steps of:

detecting write instability in the magnetic head;

heating the magnetic head to at least a predetermined temperature, wherein said predetermined temperature is greater than a temperature attained by normal write operation;

performing a write operation while the magnetic head is maintained at least at said predetermined temperature;

detecting that write stability has been restored; and resuming normal operation.

2. The method as set forth in claim 1, further comprising contacting the magnetic head with a magnetic disk while the disk is rotating, such that the magnetic head is heated by friction between the magnetic head and the rotating magnetic disk.

3. The method as set forth in claim 1, further comprising the step of moving the magnetic head to a landing zone on the magnetic disk where the magnetic head is parked during non-operation, the moving step being performed before the heating step; and the heating step further comprising causing friction between the magnetic head and the magnetic disk which is rotating.

4. The method as set forth in claim 1, wherein the write operation further comprises setting a DC erase signal in a read/write channel.

5. A method for restoring write stability to a magnetic head, comprising the steps of:

detecting write instability in the magnetic head;

heating the magnetic head to a thermally excited state;

performing a write operation while the magnetic head is thermally excited;

wherein the magnetic head is heated by applying heat to the magnetic head from the outside.

6. A method for restoring write stability to a magnetic head, comprising the steps of:

detecting write instability in the magnetic head;

heating the magnetic head to a thermally excited state;

performing a write operation while the magnetic head is thermally excited;

wherein the heating step further comprises the step of removing the magnetic head from the magnetic disk to a ramp and applying heat to the magnetic head while the magnetic head is on the ramp.

7. The method as set forth in claim 6, wherein the write operation further comprises setting a DC erase signal in a read/write channel.

8. A disk drive comprising:

means for heating the magnetic head to at least a predetermined temperature the predetermined temperature being greater than a temperature incurred by normal write operation; and means for performing a write operation while the magnetic head is maintained at least at the predetermined temperature.

9. The disk drive of claim 8 further comprising means for detecting write instability in the magnetic head.

10. The disk drive of claim 8, wherein the means for heating further comprises means to induce friction between the magnetic head and a rotating magnetic disk.

11. The disk drive of claim 10 further comprising means for moving the magnetic head to a landing zone on a magnetic disk prior to heating.

12. The disk drive of claim 8 further comprising a heater for heating the magnetic head.

13. The disk drive of claim 12, wherein the heater is positioned proximate to a ramp and wherein the disk drive further comprises means for moving the magnetic head from the magnetic disk to a ramp.

14. The disk drive of claim 13, wherein the means for performing the write operation further comprises means for setting a DC erase signal in a read/write channel.

15. The disk drive of claim 8, wherein the means for performing the write operation further comprises means for setting a DC erase signal in a read/write channel.

\* \* \* \* \*

UNITED STATES PATENT AND TRADEMARK OFFICE
CERTIFICATE OF CORRECTION

PATENT NO. : 6,441,982 B1  Page 1 of 1
APPLICATION NO. : 09/448234
DATED : September 28, 2004
INVENTOR(S) : Fukushima et al.

It is certified that error appears in the above-identified patent and that said Letters Patent is hereby corrected as shown below:

In column 3, line 49, delete paragraph [FIG. 3 is a flowchart showing an example of a method of performing dummy write in the case where an error occurs in a seek operation on a disk with a landing zone 22. In the emobodiment shown in FIG 3, if an error occurs in a seek operation, the VCM 5 is first released into a free state (S1). Then, driving current flows in the VCM 5 to move it in the direction of the landing zone 22 (S2). Some milliseconds (msec) elapse until the actuator movement is completed (S3). Then, a DC erase pattern, for example, is set in the read/write channel 9 (S4). In this state, a dummy write is started (S5). Then, some milliseconds elapse (S6) and the dummy write is ended (S7). Thereafter, the actuator 4 is released to move the data zone (S8), and the seek operation is started (S9).]

Signed and Sealed this

First Day of August, 2006

JON W. DUDAS
*Director of the United States Patent and Trademark Office*

UNITED STATES PATENT AND TRADEMARK OFFICE
CERTIFICATE OF CORRECTION

PATENT NO.       : 6,441,982 B1                                  Page 1 of 1
APPLICATION NO.  : 09/448234
DATED            : August 27, 2002
INVENTOR(S)      : Fukushima et al.

It is certified that error appears in the above-identified patent and that said Letters Patent is hereby corrected as shown below:

In column 3, line 49, delete paragraph [FIG. 3 is a flowchart showing an example of a method of performing dummy write in the case where an error occurs in a seek operation on a disk with a landing zone 22. In the emobodiment shown in FIG 3, if an error occurs in a seek operation, the VCM 5 is first released into a free state (S1). Then, driving current flows in the VCM 5 to move it in the direction of the landing zone 22 (S2). Some milliseconds (msec) elapse until the actuator movement is completed (S3). Then, a DC erase pattern, for example, is set in the read/write channel 9 (S4). In this state, a dummy write is started (S5). Then, some milliseconds elapse (S6) and the dummy write is ended (S7). Thereafter, the actuator 4 is released to move the data zone (S8), and the seek operation is started (S9).]

This certificate supersedes Certificiate of Correction issued August 1, 2006.

Signed and Sealed this

Tenth Day of October, 2006

JON W. DUDAS
*Director of the United States Patent and Trademark Office*